US012327369B2

(12) United States Patent
Quinton et al.

(10) Patent No.: US 12,327,369 B2
(45) Date of Patent: Jun. 10, 2025

(54) DIMENSIONALLY AWARE MACHINE LEARNING SYSTEM AND METHOD

(71) Applicant: SINGULOS RESEARCH INC., Burnaby (CA)

(72) Inventors: Bradley Quinton, Vancouver (CA); Trent McClements, Burnaby (CA); Michael Scott Lee, North Vancouver (CA); Scott Chin, Vancouver (CA)

(73) Assignee: Singulos Research Inc., Burnaby (CA)

( * ) Notice: Subject to any disclaimer, the term of this patent is extended or adjusted under 35 U.S.C. 154(b) by 789 days.

(21) Appl. No.: 17/671,158

(22) Filed: Feb. 14, 2022

(65) Prior Publication Data

US 2022/0351404 A1    Nov. 3, 2022

Related U.S. Application Data

(60) Provisional application No. 63/183,397, filed on May 3, 2021.

(51) Int. Cl.
| G06T 7/70 | (2017.01) |
| G06T 3/40 | (2006.01) |
| G06T 7/80 | (2017.01) |

(52) U.S. Cl.
CPC ............... G06T 7/70 (2017.01); G06T 3/40 (2013.01); G06T 7/80 (2017.01); G06T 2207/20212 (2013.01)

(58) Field of Classification Search
CPC ............... G06T 7/70; G06T 7/80; G06T 3/40
See application file for complete search history.

(56) References Cited

U.S. PATENT DOCUMENTS

2019/0171897 A1* 6/2019 Merai .................... G06N 5/048

\* cited by examiner

*Primary Examiner* — Myron Wyche
(74) *Attorney, Agent, or Firm* — Borden Ladner Gervais LLP; Todd Keeler

(57) ABSTRACT

In an aspect, the present disclosure provides a method of providing a dimensionally aware prediction for an object in an image captured by an image sensor, using a scale selective machine learning system, comprising: obtaining an input comprising image data of an object at an input image scale; generating a plurality of variant images based on re-scaling the input with a plurality of different image scaling factors, each variant image comprising the object at a variant image scale; generating a plurality of scale selective predictions based on the plurality of variant images, and assigning an in-scope response when the variant image comprises the object at an in-scope image scale, and determining a location prediction for the object based on a scale selective prediction comprising the in-scope response.

20 Claims, 15 Drawing Sheets

DIMENSIONALLY AWARE MACHINE LEARNING SYSTEM AND METHOD

CROSS REFERENCE

This application claims the benefit of priority of U.S. Provisional Patent Application No. 63/183,397, filed on May 3, 2021, and entitled SYSTEM AND METHOD FOR CREATING DIMENSIONALLY AWARE NEURAL NETWORKS, the entirety of which is incorporated herein by reference.

FIELD

The present disclosure relates generally to machine learning systems, and more particularly to machine learning systems for predicting an object location, and even more particularly to dimensionally aware neural networks for predicting an object location.

BACKGROUND

Machine Learning Systems generally, are systems that can be trained to process and analyze specific data sets to produce a decision or judgement, or to generate new data. Machine Learning Systems are trained using a Training Process. A Training Process generally includes the process in which, using various search and optimization processes (e.g., backpropagation), the Parameters of the Machine Learning System are iteratively adjusted based the evaluation of a Cost Function. In other words, the Training Process is the process of finding a set of Parameters for a given Machine Learning System that achieve a prediction goal of the system.

In some cases, the Training Process proceeds iteratively with the Parameters being updated and the Cost Function evaluated until the training Cost (e.g. a measurement of deviation of one or more a given Predictions from one or more Labels; the Cost is calculated by the Cost Function) goal is achieved, the maximum number of allowed iterations have completed, or some other condition or constraint is met. Parameters include the internal states of the Machine Learning System that are changed during the Training Process and recorded for use when the Machine Learning System is tested or used in a Deployed Scenario when the trained, and optionally tested, Machine Learning Systems can be used to generate Predicted Labels (e.g. the Label generated by the Machine Learning System for given Input Data) for never-before-seen Input Data. Often this Input Data is supplied by another higher-level system and the Predicted Labels are passed back to the higher-level system.

Cost Functions generally measure the accuracy of a given Prediction (e.g. the process of generating a Predicted Label) versus a Label (e.g. examples of desired outputs of a Machine Learning System). During the Training Process, the Cost Function acts as a proxy to results of the Prediction Engine (e.g. the portion of the Machine Learning System that processes the output of the Machine Learning Engine to predict the Label), in the sense that lowering the Cost, should lead to more accurate Predictions from the Prediction Engine, (however, this is not strictly true, and it is possible that lowering the Cost according to the Cost Function does not improve the accuracy of the Predicted Labels). The Cost Function result is used to update the Parameters of the Machine Learning Engine with the goal of finding a set of Parameters which lowers the Cost. This can be done with a number of search and optimization methods including backpropagation, etc.

The Machine Learning Engine generally includes the portion of the Machine Learning System that is trained during the Training Process. The output of the Machine Learning Engine is processed by the Prediction Engine to predict the Label. Machine Learning Engine and the Prediction Engine define the complete processing capabilities of the system and can be used to deterministically generate a Predicted Label from any given Input Data. There are many ways to implement a Machine Learning System, including using an artificial neural network, recurrent neural networks, convolutional neural networks, logistic regression, support vector machines, etc. These Machine Learning Systems are used for a large variety of applications including Image Classification, object detection, Dynamic Object Comprehension, etc.

Machine Learning Systems can be used for many important tasks related to comprehending a physical environment through Image Data, a type of Input Data created by projecting a signal onto one or more physical surfaces or sensors. The signal source may be one of many types including but not limited to visible light, electromagnetic radiation (infrared, thermal), sonar, RADAR, LiDAR, electron microscope or others. Image Data contains spatial features that can be organized in representations in two-dimensional, or higher-dimensional, space. Input Data may include one or more data elements applied to a Machine Learning System. Specific examples of Input Data are Image Data, audio data, GPS co-ordinates, purchasing habits, personal data, etc.

Some examples of Image Data processing tasks are Image Classification, object detection and Dynamic Object Comprehension. Image Classification generally includes the Classification problem for when the input is Image Data. For example, given Image Data, the system predicts to which class the image belongs and/or attempts to localize a location of the Object of Interest in the Image Data. In practice, a system designed to perform Image Classification supports a finite set of classes. A class may represent a specific type of object, or a more abstract concept such as an Out-Of-Scope (e.g. a class in a classification system that represents an input that does not belong to another class supported by the classification system). Dynamic Object Comprehension generally includes simultaneous, real-time, identification, localization and tracking of one or many Objects of Interest across one or many object classes. Thereby enabling real-time interaction between physical and virtual worlds and unlocking next generation applications ranging from augmented reality/mixed reality and robotics to on-line advertising and retail experiences. An Object of Interest generally includes an object that is the subject of processing or analysis to increase the systems understanding of some aspect of the object. This processing may be done with Machine Learning Systems or other systems capable of processing Image Data. Specific examples of an Object of Interest include a LEGO™ brick, a chess piece, dye, figurine, etc.

It remains desirable therefore, to develop further improvements and advancements in relation to Machine Learning Systems, including but not limited to improving Machine Learning Systems, for example, improving a Training Process or operation in relation to Image Classification, object detection and Dynamic Object Comprehension for Image Data (and other Input Data), localizing objects and Objects of Interest, and to overcome shortcomings of known techniques, and to provide additional advantages thereto.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
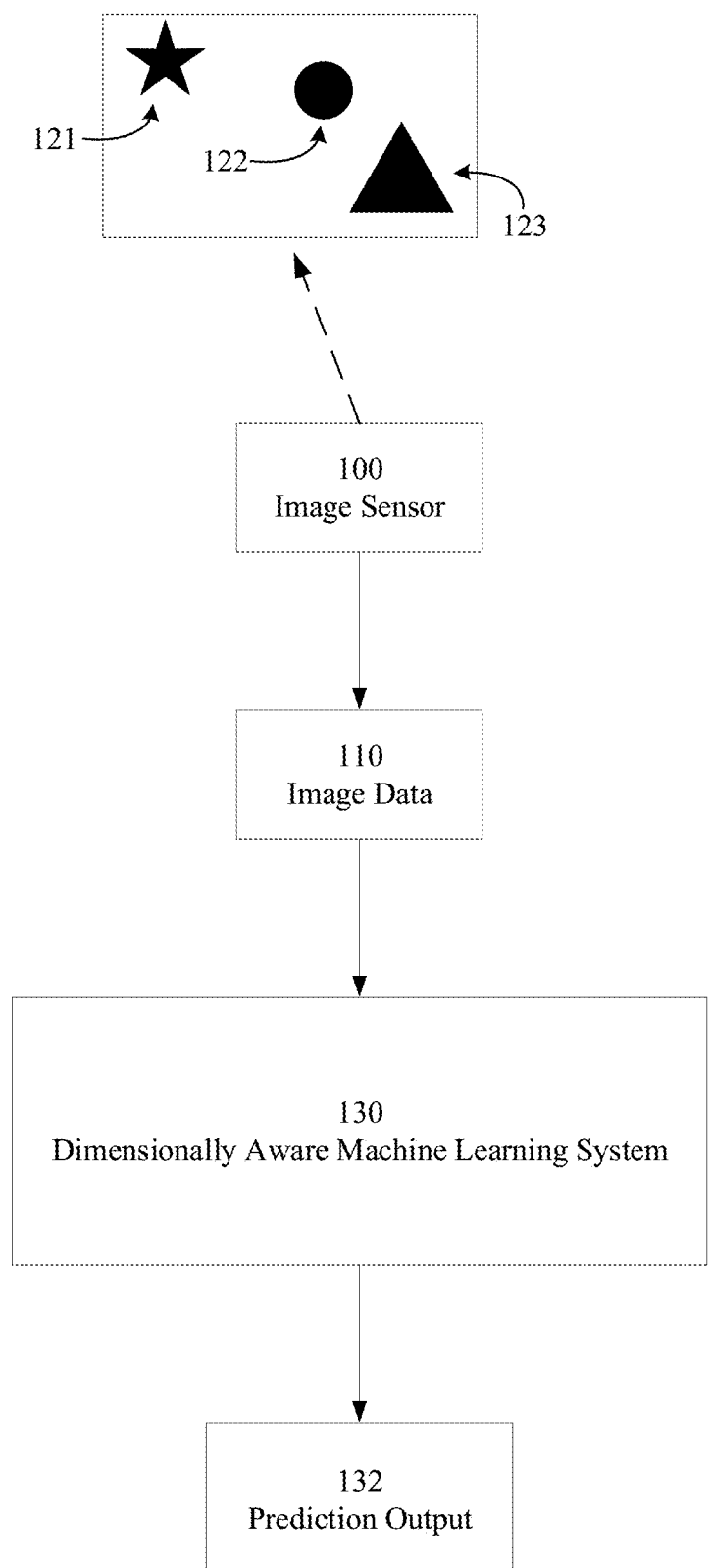
FIG. 1 is a block diagram of a Dimensionally Aware Machine Learning System for localizing an Object Location in accordance with an embodiment of the present disclosure comprising a deployment with a single image sensor.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for Dimensionally Aware Neural Network systems and methods in accordance with the present disclosure.

In an aspect, the present disclosure provides a method of providing a dimensionally aware prediction for an object in an image captured by an image sensor, using a scale selective machine learning system, comprising: obtaining an input comprising image data of an object at an input image scale; generating a plurality of variant images based on re-scaling the input with a plurality of different image scaling factors, each variant image comprising the object at a variant image scale; generating a plurality of scale selective predictions based on the plurality of variant images, and assigning an in-scope response when the variant image comprises the object at an in-scope image scale, and determining a location prediction for the object based on a scale selective prediction comprising the in-scope response.

In an example embodiment, providing the dimensionally aware prediction further comprises assigning an out-of-scope response when the variant image comprises the object at an out-of-scope image scale.

In an example embodiment, providing the dimensionally aware prediction further comprises determining the input image scale of the object based on an image scaling factor used to generate the object at the variant image scale having the in-scope response.

In an example embodiment determining the location prediction comprises comparing the input image scale of the object to a known size of the object.

In an example embodiment, providing the dimensionally aware prediction further comprises determining the input image scale based on focal properties of the image sensor wherein the focal properties comprise at least one of a focal length of the image sensor, a size of the image data, and a size of the image sensor.

In an example embodiment, calibrating the image sensor to determine the focal properties of the image sensor.

In an example embodiment, determining the location prediction comprises determining a distance between the object and the image sensor.

In an example embodiment, determining the location prediction comprises determining a spatial location of the object within the input image data.

In an example embodiment, the image data comprises a two-dimensional projection of the object from a higher order dimension.

In an example embodiment, providing the dimensionally aware prediction further comprises generating a composite image comprising the plurality of variant images.

In an example embodiment, generating the composite image comprises concatenating the plurality of variant images along an axis of the composite image.

In an example embodiment, each of the plurality of scale selective predictions corresponding to a spatial location proximal to a concatenation comprise an invalid response.

In an example embodiment, generating the composite image comprises arranging the plurality of variant images within the composite image in accordance with a bin-packing algorithm.

In an example embodiment, generating a scale selective response map comprising a plurality of response entries correspondingly encoded with the plurality of scale selective predictions of the plurality of variant images.

In an example embodiment, the scale selective response map comprises a plurality of scale selective response maps, each corresponding to a variant image of the plurality of variant images.

In an example embodiment, providing the dimensionally aware prediction further comprises re-scaling each of the plurality of scale selective response maps to the input image scale based on applying an inverse of an image scaling factor used to generate the corresponding variant image.

In an example embodiment, a spatial location of a response map entry within the scale selective response map corresponds to a spatial location of the object within the variant image.

In an example embodiment, determining a planar location of the object within the input image data is based on the spatial location of the response map entry encoded with the in-scope response.

In an example embodiment, the plurality of image scaling factors are selected for generating the plurality of variant images based on down-sampling the input image data.

In an example embodiment, the location prediction further comprises a prediction of at least one of a rotation of the object, a class of the object, and a bounding-box of the object.

An image sensor may capture Image Data of an object at different Image Scales, varying based on a distance between the image sensor and the object. Accordingly, an Image Scale of an object may be leveraged to determine a distance or location of the object, for example, a relative distance (or object depth) between the object and the image sensor. Parameters of the image sensor, such as focal length, and the image sensor lens, and other factors such as optical distortions present in the image sensor, may also influence determining a location of the object. For example, an image sensor may capture a plurality of images of a chess piece. The image sensor may capture a first image of the chess piece from a first location and a second image of the chess piece from a second location. Each of the first image and second image will comprise Image Data of the chess piece at respective first and second Image Scales based on a distance between the chess piece and the image sensor. Thus for example, if the first location is closer to the chess piece relative the second location, the first image may comprise Image data of the chess piece at a first Image Scale greater than a second Image Scale of the second image. Machine Learning Systems as disclosed herein may be trained to identify objects a certain Image Scales, for example, at In-Scope Scales. Accordingly, by providing such systems with a plurality of Scaled Variants of Image Data, the Machine Learning System can identify a Scaled Image having an In-Scope scale and leverage known information about the object properties, scaling factors applied to the original Image Data, and/or properties about the camera, to predict a location of the object. Accordingly, aspects as disclosed here include a Dimensionally Aware Machine Learning System and method for providing a prediction output based on an input Image Data, the prediction output comprising an indication of a location of an object, including but not limited to: a three-dimensional object location in the real world, a planar location within the Image Data, and/or a object depth or distance of the object relative to the image sensor.

FIG. 1 illustrates a block diagram of an embodiment of a Dimensionally Aware Machine Learning System 130 trained to provide a prediction output 132 comprising a Predicted Label (e.g. the Label or output generated by a Machine Learning System) for Input Data, such as for input Image Data 110, wherein the Predicted Label may comprise an Object Location (e.g. a three-dimensional spatial location) of an object in the Input Data. For example, an image sensor 100 may capture Image Data 110 of a plurality of objects 121, 122, and 123, corresponding to a star, a circle, and a triangle, respectively, for use as Input Data to the Machine Learning System 130 which provides a prediction output 132 comprising a Predicted Object Location of one or more of the objects 121, 122, and 123. The prediction output 132 may further comprise other Predictions (e.g. the process of generating or outputting a Prediction Label for a given input) that may or may not relate to location. In an embodiment, the Input Data to a Machine Learning System comprises Image Data. In an embodiment, the Image Data comprises two-dimensional Image Data. In an embodiment, the Image Data comprises a projection of objects from a higher order dimension. In an embodiment, the Machine Learning System 130 performs multiple iterations on the same Input Data to improve a Prediction accuracy of the Machine Learning System 130.

Figure 2:
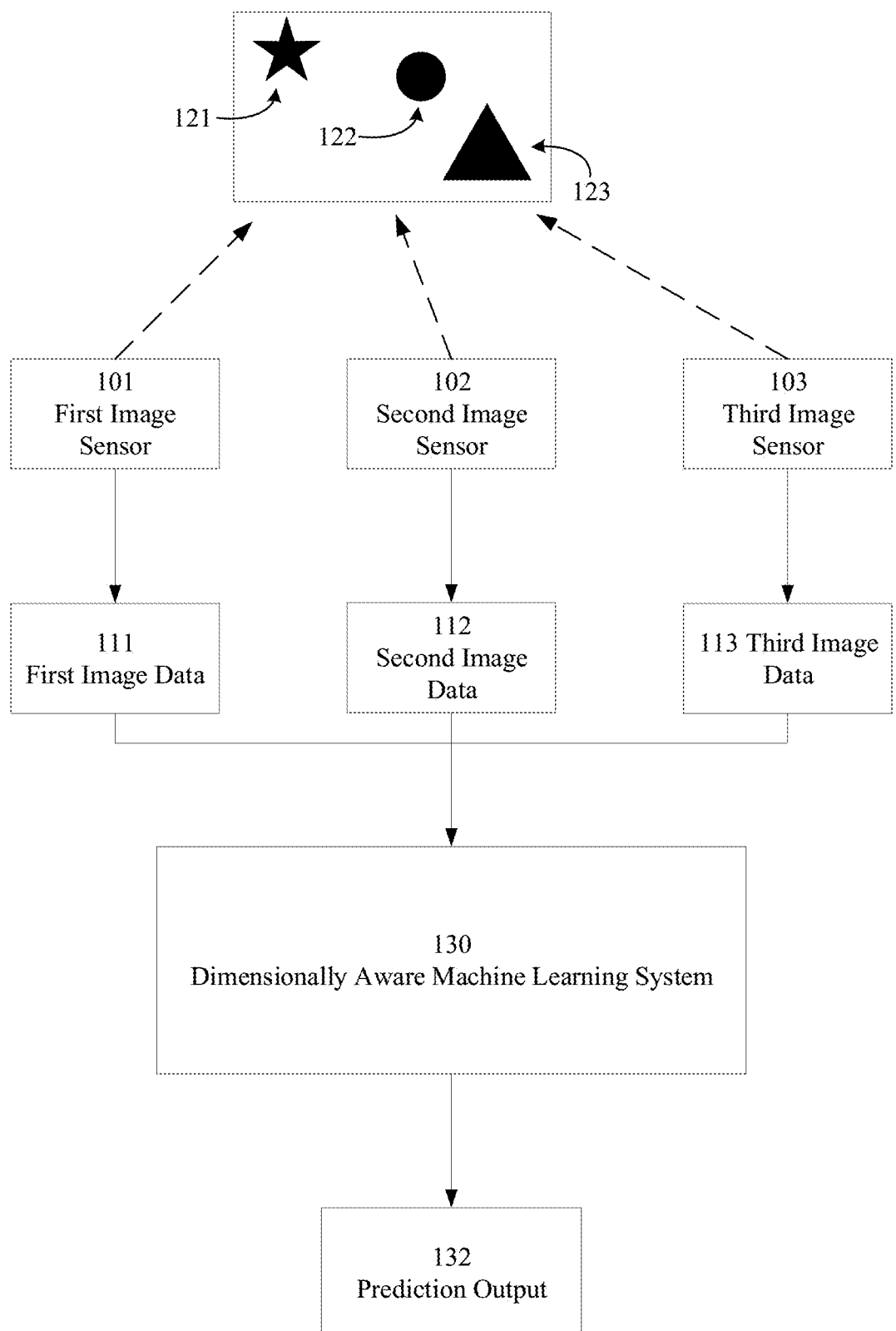
FIG. 2 is a block diagram of a Dimensionally Aware Machine Learning System for localizing an Object Location in accordance with an embodiment of the present disclosure comprising a deployment with a plurality of image sensors.

FIG. 2 illustrates a further embodiment of deploying the Dimensionally Aware Machine Learning System 130 illustrated in FIG. 1. For example, the embodiment illustrated in FIG. 2 comprises a plurality of image sensors rather than a single image sensor. In particular, a first image sensor 101, second image sensor 102, and third image sensor 103, each generate first image data 111, second image data 112, and third image data 113, respectively, corresponding to Image Data of the objects 121, 122, and 123. Accordingly, the Image Data for each image sensor may be different based on a distance and a perspective of an image sensor relative to the objects, and based on characteristics of the image sensor, such as for example a focal length of the image sensor. Advantageously, use of two or more image sensors to capture Image Data of the same scene may be used to triangulate an Object Location based on knowledge of the relative location of each image sensor to the other, and may improve an Object Location Prediction of the Machine Learning System 130.

Figure 3:
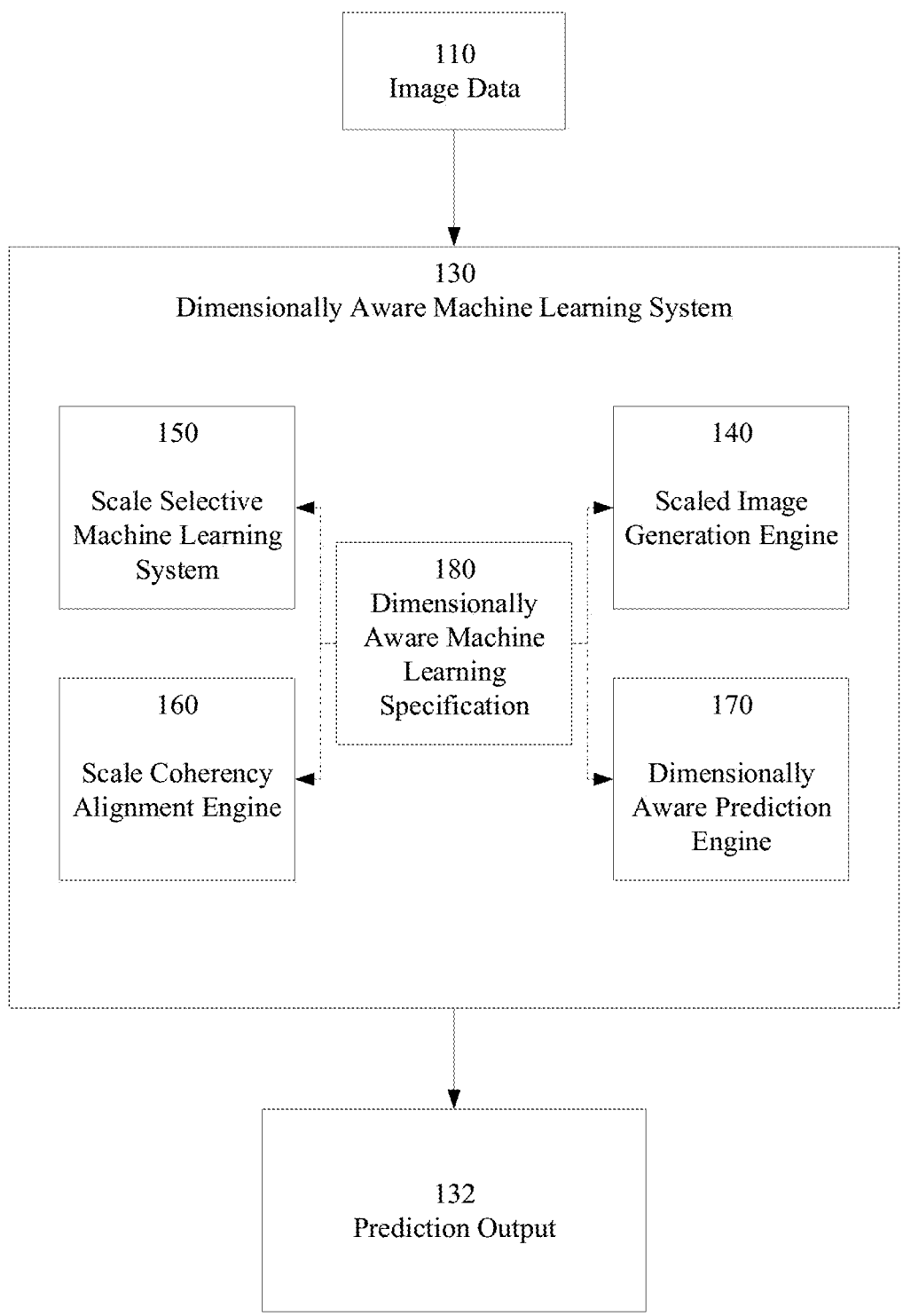
FIG. 3 is a block diagram of a Dimensionally Aware Machine Learning System comprising a plurality of sub-components in accordance with an embodiment of the present disclosure.

Embodiments of a Dimensionally Aware Machine Learning System 130 as illustrated in FIGS. 1 and 2 may be implemented as a combination of components as illustrated in FIG. 3. For example, the Machine Learning System 130 may comprise a Scaled Image Generation Engine 140, Scale Selective Machine Learning System 150, Scale Coherency Alignment Engine 160, and Dimensionally Aware Prediction Engine 170, further configured based on a Dimensionally Aware Machine Learning Specification 180. In an embodiment, the Machine Learning Specification 180 comprises a plurality of specifications for configuring and supporting operation of the Machine Learning System 130. In an embodiment, the Machine Learning Specification 180 comprises at least one of: an Image Scaling Factor Specification 182, a Scaled Image Data Organization Specification 184, an In-Scope and Out-of-Scope Scale Specification 186, and Object of Interest Specification 187, and an Image Sensor Specification 188.

Figure 4:
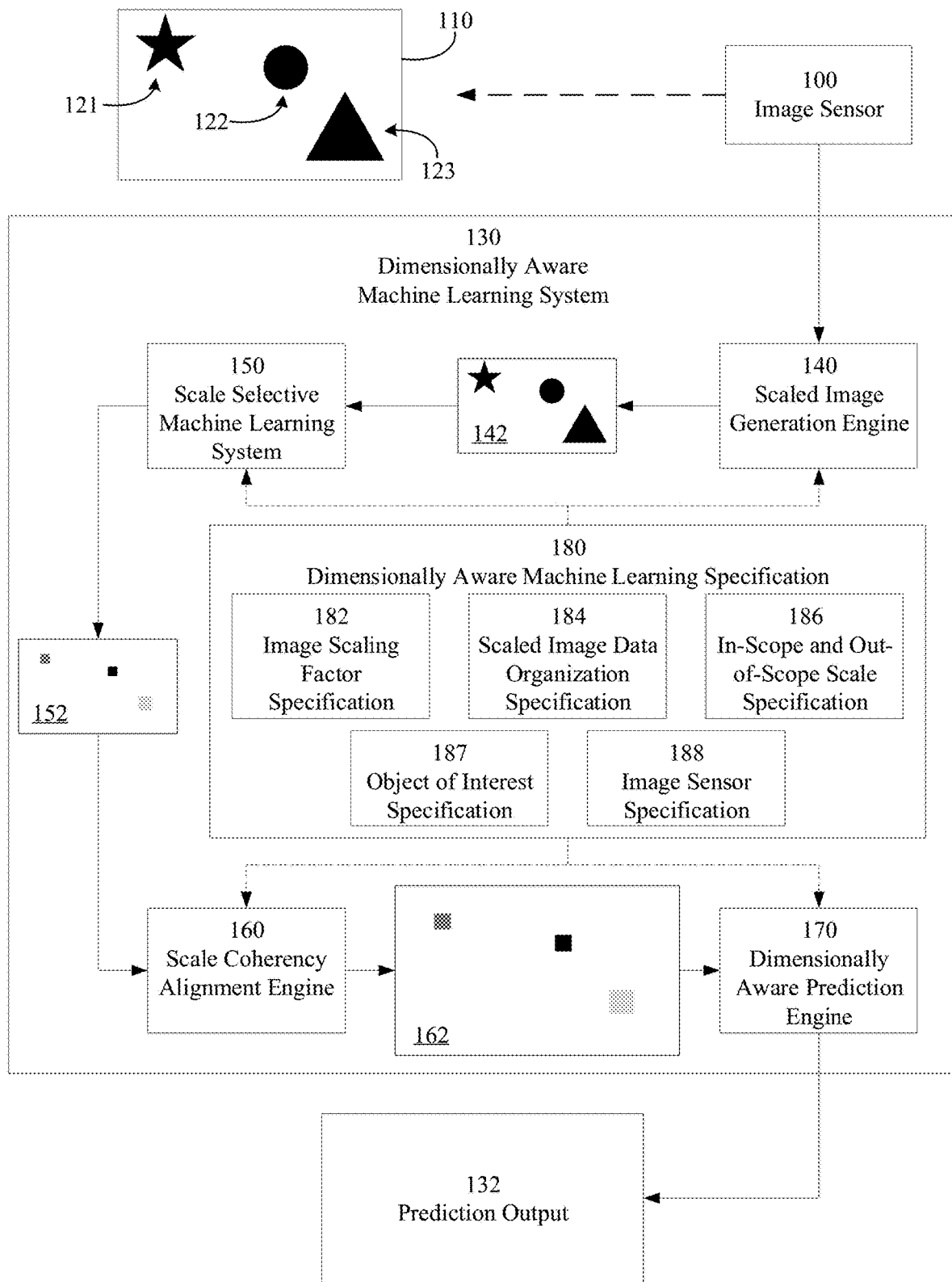
FIG. 4. is a more detailed block diagram of the Dimensionally Aware Machine Learning System illustrated in FIG. 3, further comprising an illustrative example of processing input Image Data to generate a Prediction Output for a single image sensor deployment.

FIG. 4 further depicts an illustrative example of the Machine Learning System 130 of FIG. 3. In particular, an image sensor 100 obtains Image Data 110 of a plurality of objects 121, 122, and 123. The Image Data 110 is provided as an input to the Scaled Image Generation Engine 140 of the Machine Learning System 130. The Scale Image Generation Engine 140 applies an Image Scaling Factor to the Image Data 110 to generate a Scaled Image or Scaled Image Variant 142 of the Image Data 110. For example, the Image Scaling Factor may comprise a value of 1.2 for increasing a size of the Image Data 110 by a factor of 1.2. The Image Scaling Factor may comprise a set of N Image Scaling Factors for generating a corresponding set of N Scaled Images. In an embodiment, an Image Scaling Factor Specification 182 defines one or more Image Scaling Factors for use in scaling Image Data. In an embodiment, the Image Data comprises an object at a maximum scale. In an embodiment, the Scaled Image Generation Engine 140 only applies Image Scaling Factors which reduce a size of the Image Data (i.e. down-sampling), obviating the need to create new data as may be required when up-scaling the Image Data, and typically requiring fewer computational resources than up-scaling. The Scaled Image Generation Engine 140 may re-scale the Image Data 110 based on a re-scaling algorithm including, but not limited to: nearest-neighbour interpolation, bilinear interpolation, bi-cubic interpolation, and use of a Machine Learning System configured to rescale Image Data.

Figure 5A:
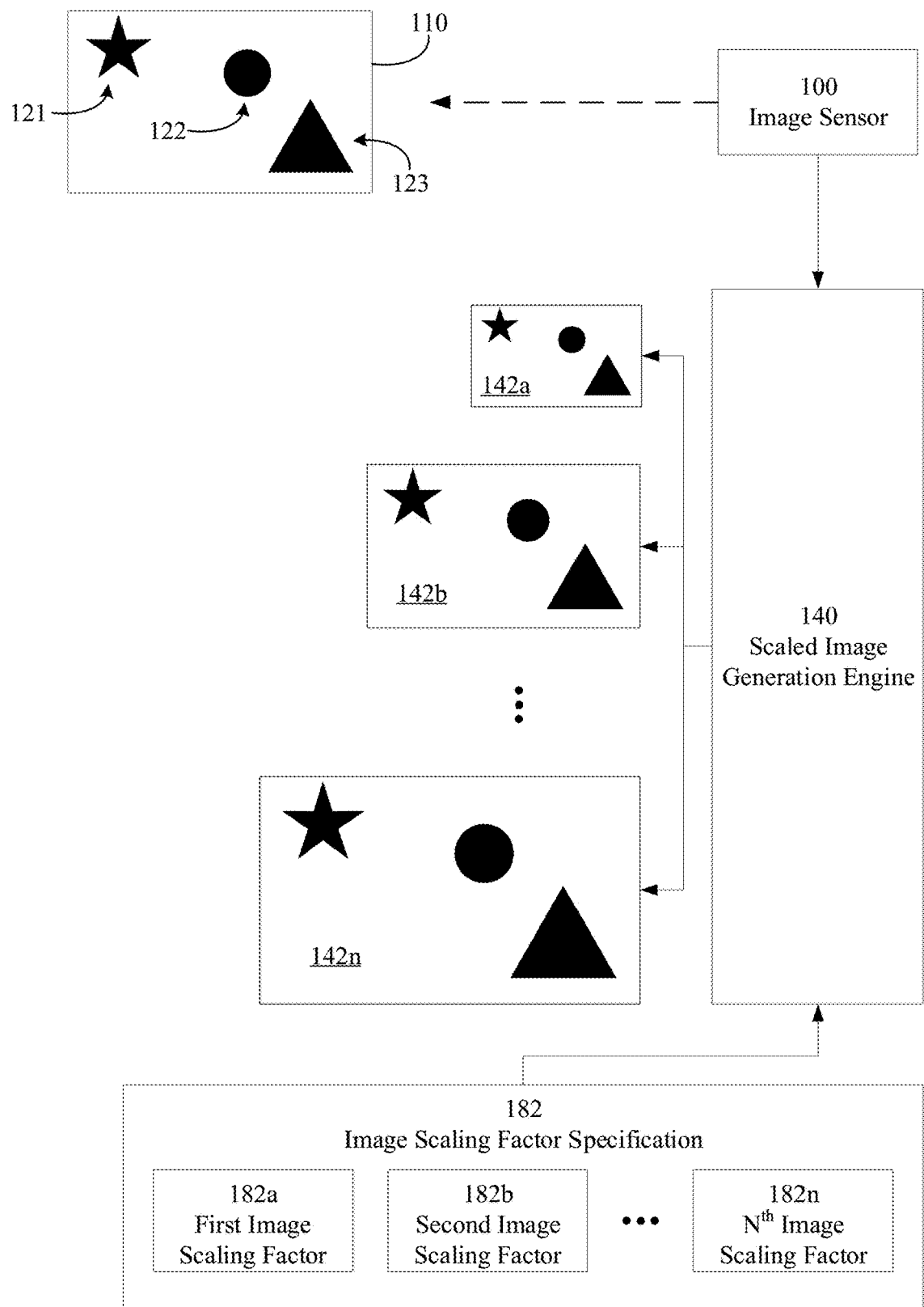
FIGS. 5A, 5B, and 5C collectively illustrate a series of outputs from sub-components of the Machine Learning System illustrated in FIG. 4, for generating a plurality of Scaled Images, generating a corresponding plurality of Scale Selective Response Maps, and generating a corresponding plurality of Scale Coherent Response Maps, in accordance with an embodiment of the present disclosure.
Figure 6A:
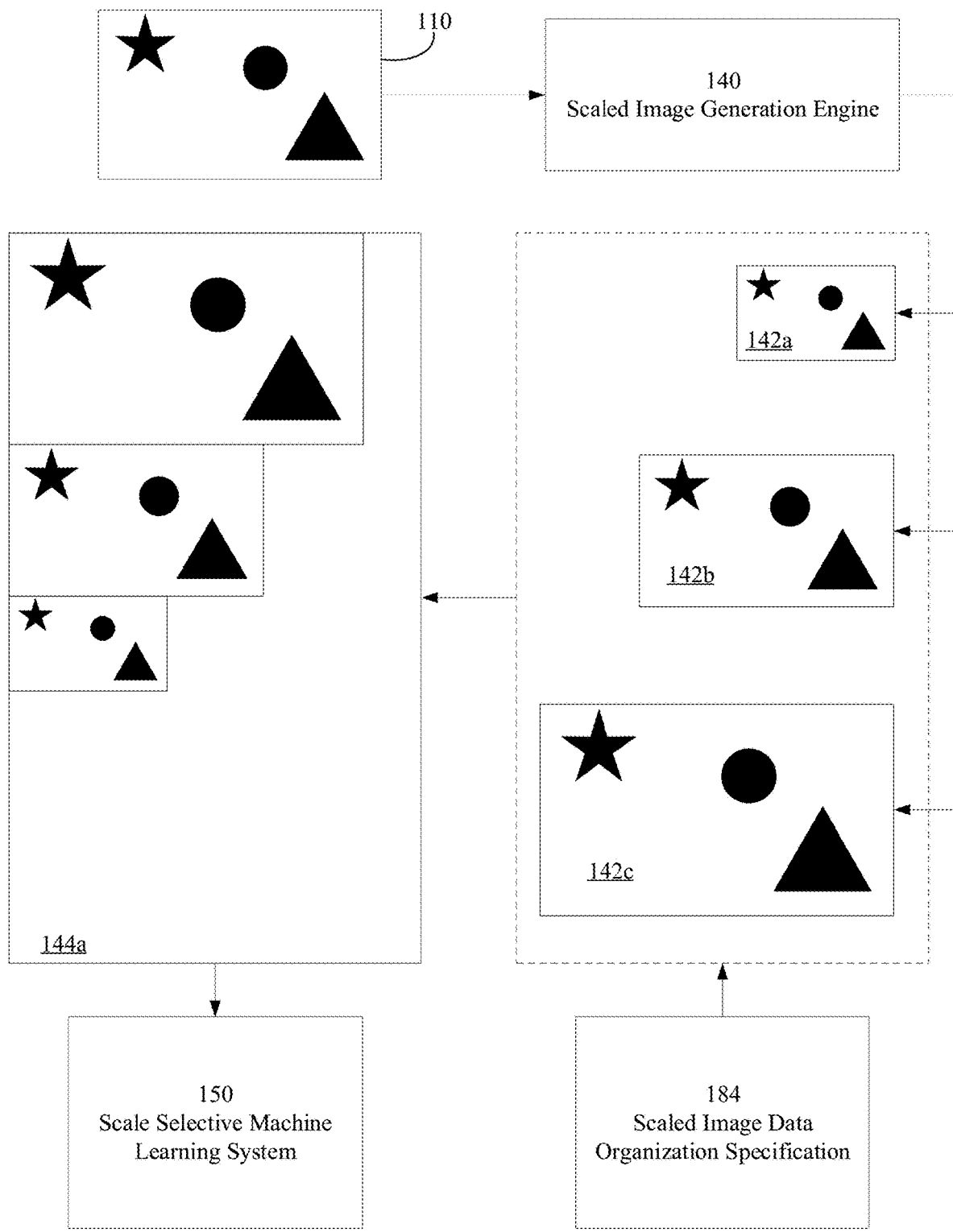
FIGS. 6A, 6B, and 6C collectively illustrate a series of outputs from sub-components of the Machine Learning System illustrated in FIG. 4, for generating a Composite Image of a plurality of Scaled Images based on concatenating the Scaled Images about a spatial axis of the Composite Image, generating a corresponding composite Scale Selective Response Map, and generating a corresponding composite Scale Coherent Response Maps, in accordance with an embodiment of the present disclosure.
Figure 7A:
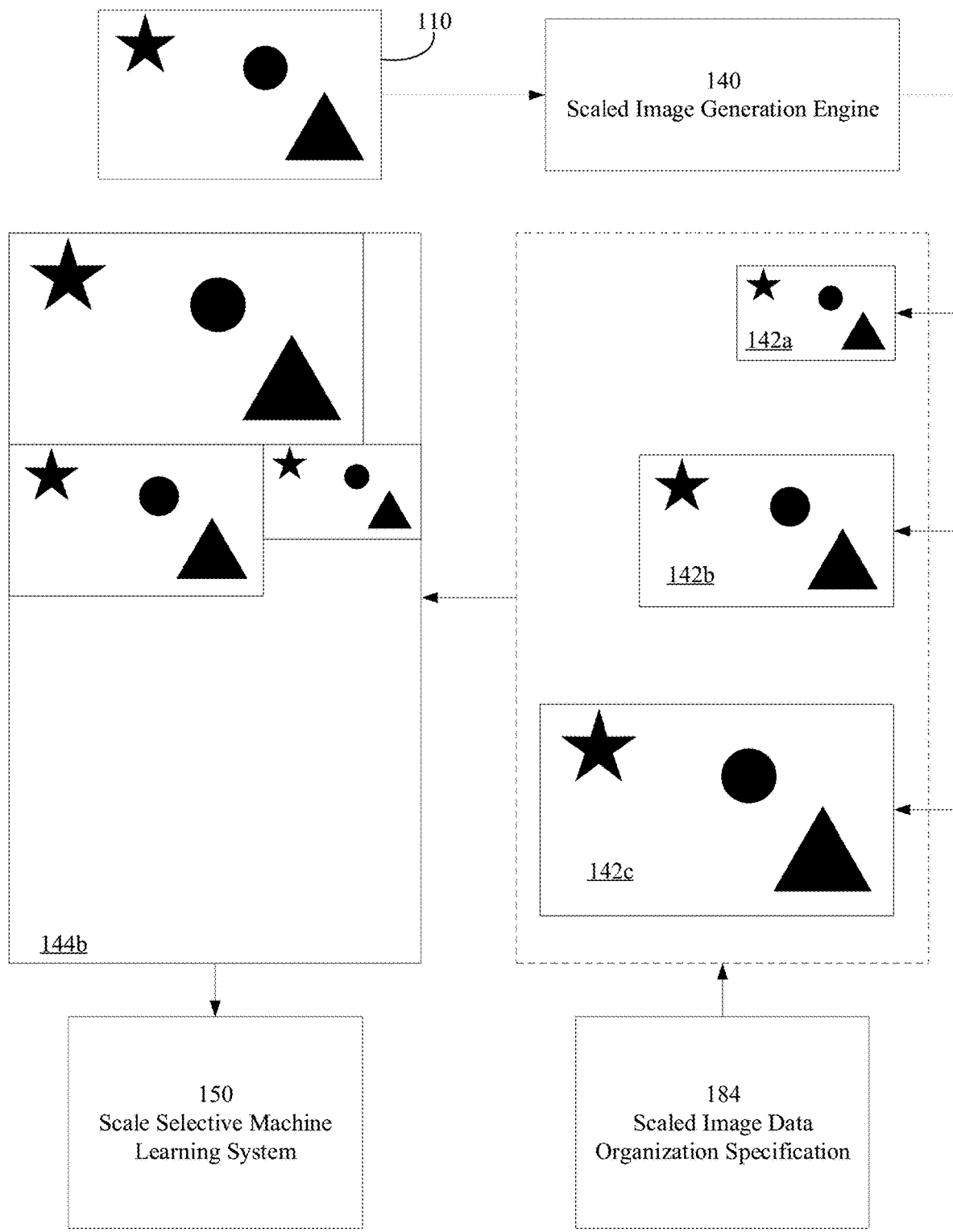
FIGS. 7A, 7B, and 7C collectively illustrate a series of outputs from sub-components of the Machine Learning System illustrated in FIG. 4, for generating a Composite Image of a plurality of Scaled Images based on a bin-packing algorithm, generating a corresponding composite Scale Selective Response Map, and generating a corresponding composite Scale Coherent Response Maps, in accordance with an embodiment of the present disclosure.

A Scaled Image Data Organization Specification 184 may be applied to organize an output of the Scaled Image Generation Engine 140. As illustrated in FIG. 5A for example, the Scaled Image Generation Engine 140 may be configured to output a plurality of Scaled Images 142a, 142b, . . . , 142n, based on applying a plurality of corresponding Image Scaling Factors 182a, 182b, . . . , 182n, to an input Image Data 110. Embodiments of a Scaled Image Data Organization Specification may also yield composite images having different sizes and aspect ratios. Advantageously, Machine Learning Systems may generally process a single composite image of a plurality of images more efficiently that individually processing each of the plurality of images. In an embodiment, as illustrated in FIGS. 6A and 7A, the Scaled Image Data Organization Specification 184 may be applied to an output of the Scaled Image Generation Engine 140 to generate a single, composite Image 144a (FIG. 6A) and 144b (FIG. 7A) from a plurality of Scaled Images 142a, 142b, and 142c. A composite image may be generated in accordance with a bin-packing algorithm (e.g. the composite image 144b of FIG. 7A), or based on other methods, such as a concatenating the plurality of Scaled Images along a spatial dimension of the composite image, as illustrated by the composite image 144a of FIG. 6A. In an embodiment, as illustrated for example by the composite image 144a, the Scaled Images are concatenated along a spatial axis of the composite image 144a.

As further illustrated in FIG. 4, the Scaled Image 142 output from the Scaled Image Generation Engine 140 may be provided as an input to the Scale Selective Machine Learning System 150. Embodiments of a Scale Selective Machine Learning System as disclosed herein may include providing an output indicative of whether an object in the Scaled Image comprises an In-Scope Scale (e.g. an Image Scale at which an Object may appear in Image Data that yields an In-Scope Prediction) or Out-of-Scope Scale (e.g. an Image Scale at which an Object may appear in Image Data that yields an Out-of-Scope Prediction). For example, the Scaled Selective Machine Learning System may output Scale Selective Predictions indicative of whether an object in a Scale Image comprises an In-Scope Scale or an Out-of-Scope Scale. In an embodiment, an In-Scope and Out-of-Scope Scale Specification 186 defines a set of In-Scope Scales and Out-of-Scope Scales for use in configuring the Scale Selective Machine Learning System 150 to predict whether an object depicted in the Scaled Image comprises an In-Scope Scale, or comprises another class of scale, such as an Out-of-Scope Scale. In an embodiment the set of In-Scope Scales comprises a single In-Scope Scale. In an embodiment, the set of In-Scope Scales comprises a plurality of discrete In-Scope Scales. In an embodiment, the set of In-Scope Scales comprises one or more continuous ranges of In-Scope Scales. Similarly, Embodiments of a set of Out-of-Scope scales may comprise one or more continuous ranges of Out-of-Scope Scales. For example, a Scale Specification 186 may define a set of In-Scope Scales and Out-of-Scope Scales for a feature of an Object of Interest, such as the width of a stud located on a LEGO™ block. For example, the Scale Specification 186 may define a set of Image Scales: 9 pixels/stud, 10 pixels/stud, 11 pixels/stud, 12 pixels/stud, 13 pixels/stud, 14 pixels/stud, and 15 pixels/stud, and further define a set of In-Scope Scales comprising the Image Scales 11 pixels/stud, 12 pixels/stud, and 13 pixels/stud. The remaining Image Scales define the set of Out-of-Scope Scales. Other undefined Image Scales may simply illicit a don't care response. The result of this Scale Specification is such that, the Scale Selective Machine Learning System 150 will output an In-Scope Scale response when receiving an input Image Data comprising a LEGO™ block having a stud at an In-Scope Image Scale between 11-13 pixels/stud.

Figure 5B:
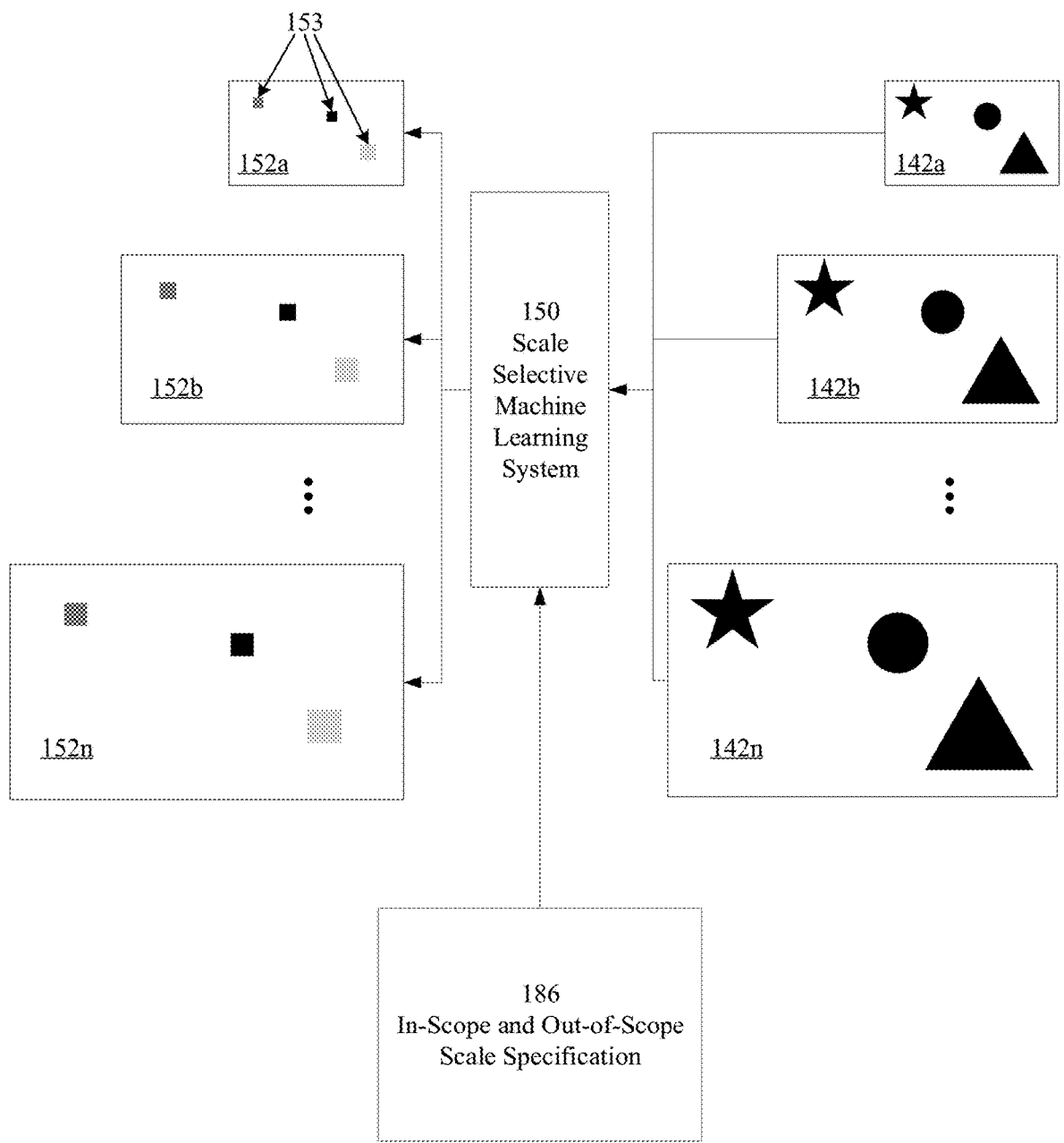

In an embodiment, the Scale Selective Machine Learning System outputs a Scale Selective Response Map 152 comprising a plurality of Response Map Entries. As illustrated in FIG. 5B, the Scale Selective Machine Learning System 150 may output a plurality of Scale Selective Response Maps 152a, 152b, . . . , and 152n, each corresponding to a respective one of the plurality of Scaled Images 142a, 142b, . . . , and 142n. Each of the Scale Selective Response Maps comprising a plurality of Response Map Entries 153. In an embodiment, Each Response Map Entry 153 is disposed in a location corresponding to a location of the object in the Scaled Image. In an embodiment, A Response Map Entry is disposed in a location corresponding to a center location of an object in a corresponding Scaled Image. In an embodiment, each of the Response Map Entries 153 comprise a Scale Selective Prediction (e.g. a Prediction Label relating to an Image Scale of a given object or input). In an embodiment, the Scale Selective Prediction comprises an In-Scope Prediction or an Out-of-Scope Prediction. In an embodiment, each of the Response Map Entries are encoded with an indication of whether the corresponding object is an In-Scope Object.

Figure 6B:
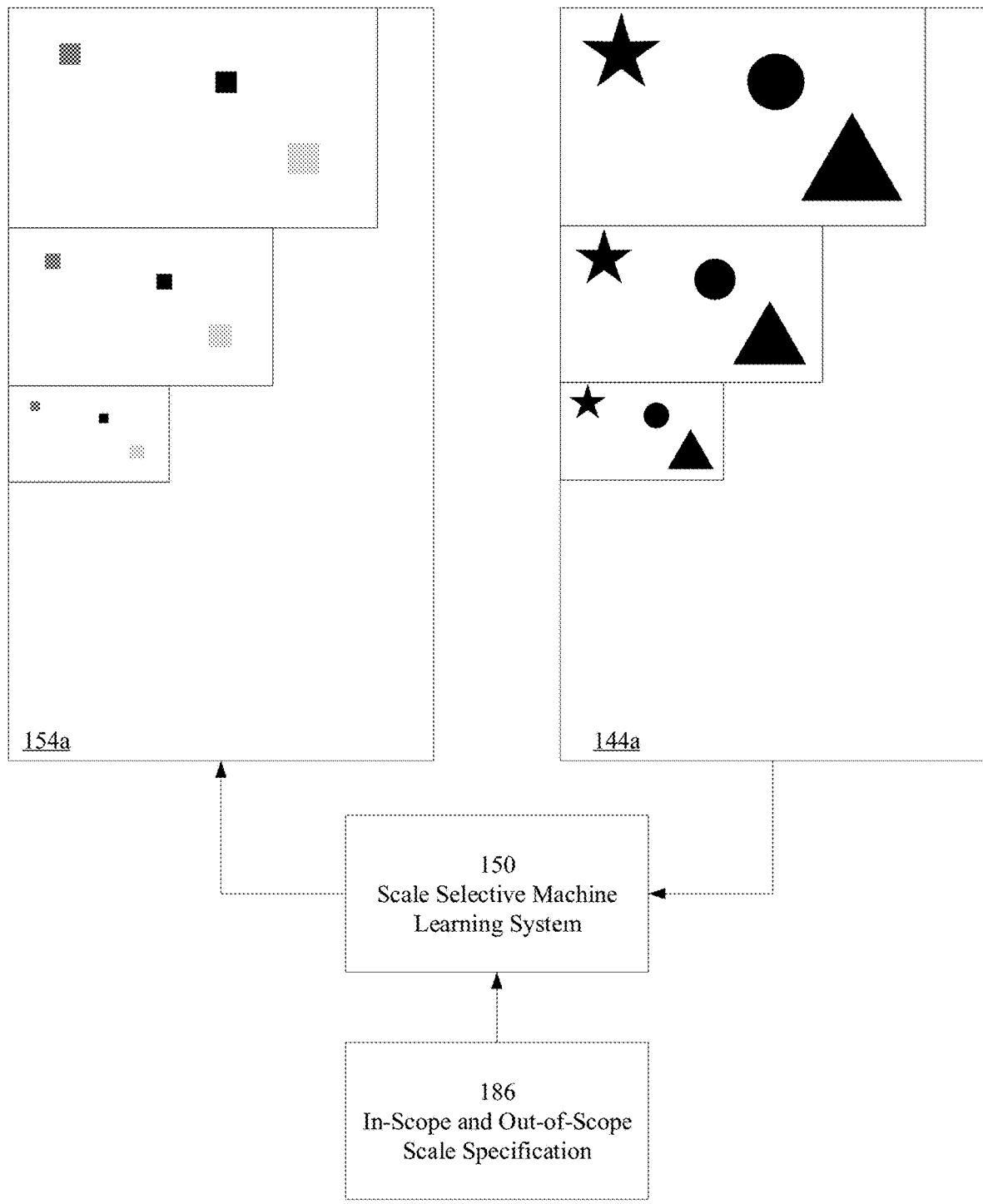
Figure 7B:
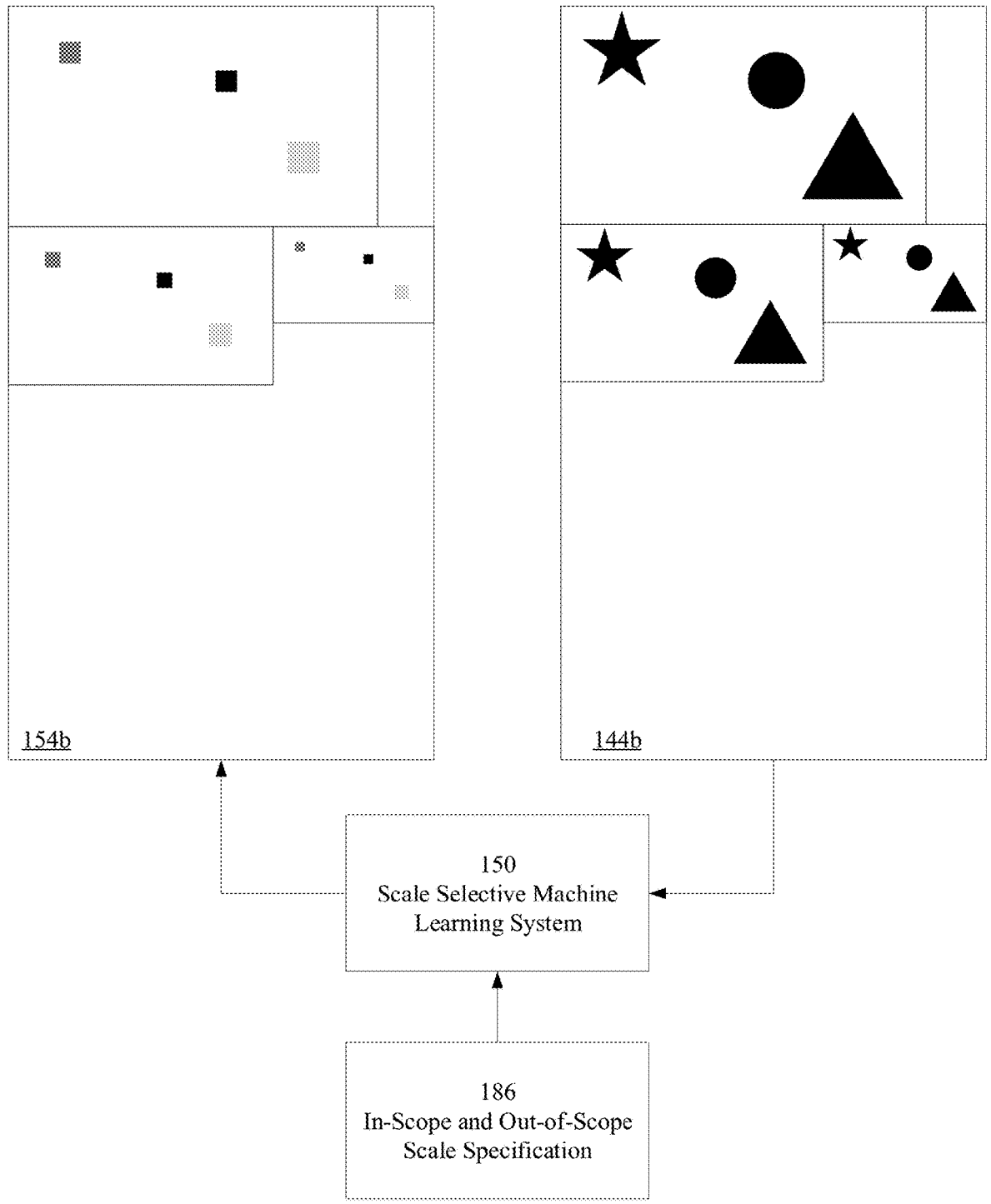

Embodiments of a Scale Selective Machine Learning System 150 may be configured to receive a composite image rather than a plurality of Scaled Images. As illustrated for example in FIG. 6B, the Scale Selective Machine Learning System 150 may receive a Composite Image 144a and output a corresponding composite Scale Selective Response Map 154a. As similarly illustrated in FIG. 7B, the Scale Selective Machine Learning System may receive a different Composite Image 144b and output a corresponding composite Scale Selective Response Map 154b.

As further illustrated in FIG. 4, an output of the Scale Selective Machine Learning System 150 may be provided as an input to a Scale Coherency Alignment Engine 160. For example, the Scale Coherency Alignment Engine 160 may receive a Scale Selective Response Map 152 from the Machine Learning System 150, and may further receive the Image Scaling Factor Specification 182 and the Scaled Image Data Organization Specification 184 from the Dimensionally Aware Machine Learning Specification 180, for use in interpreting the scale and organization of the output of the Scale Selective Machine Learning System 150. Embodiments of a Scale Coherency Alignment Engine 160 may receive as input, a Scale Selective Response Map, including a plurality of individual Scale Selective Response Maps (e.g. FIG. 5C) or a composite of a plurality of Scale Selective Response Maps (e.g. FIGS. 6C and 7C). In an embodiment, an output of the Scale Coherency Alignment Engine comprises a Scale Coherent Response Map 162 corresponding to a Scale Selective Response Map 152. Embodiments of a Scale Coherency Alignment Engine 160 may output a Scale Coherent Response Map 162 for each corresponding Scale Selective Response Map input. In an embodiment, the Scale Coherency Alignment Engine 160 may re-scale each Scale Selective Response Map to a common size and dimension. In an embodiment, the Scale Coherency Alignment Engine 160 may received the Image Scaling Factor Specification 182 and re-scale each Scale Selective Response Map based on an Image Scaling Factor applied to the underlying Scaled Image. In an embodiment, re-scaling the Scale Selective Response Map is based on applying an inverse of the Image Scaling Factor used in generating the corresponding Scaled Image.

Functionally, the Scale Coherency Alignment Engine 160 provides a coherent interpretation across a plurality of Scale Selective Response Maps. For example, each Scale Selective Response Map is an output response resulting from a Scaled Image generated based on applying an Image Scaling Factor to the same initial Image Data 110. Accordingly, though the shape and size of each Scale Selective Response Map may differ, each map comprises a response based on the same common input Image Data. In this regard, the Scale Coherency Alignment Engine 160 maintains concordance between the different scales based on interpreting how information (e.g. a location) at a first Image Scale in a first Scale Selective Response Map relates to information at a second Image Scale in a second Scale Selective Response Map. In other words, the Scale Coherency Alignment Engine 160 provides interpretive concordance across the different sized and shaped Scale Selective Response Maps.

Figure 5C:
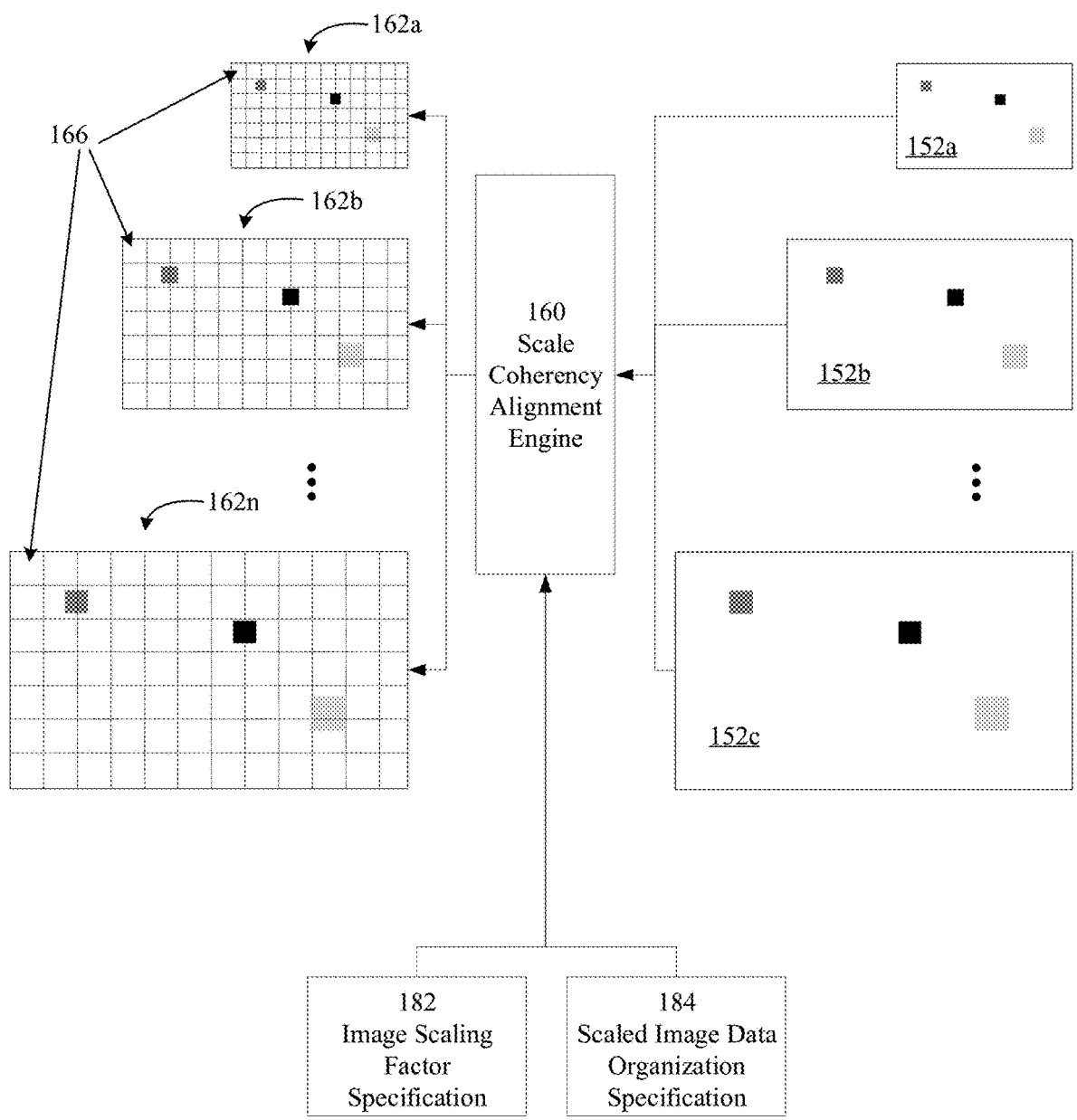
Figure 6C:
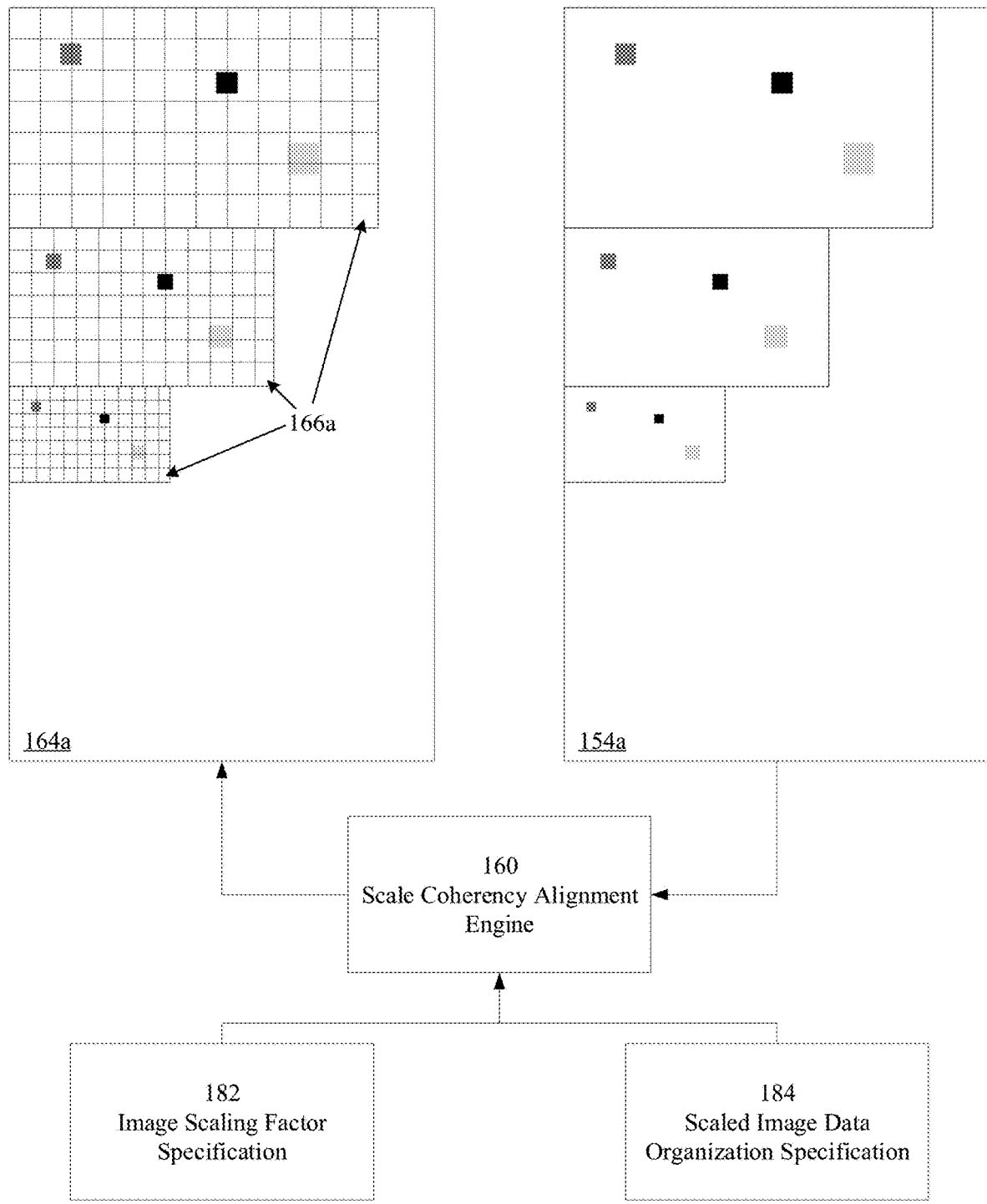
Figure 7C:
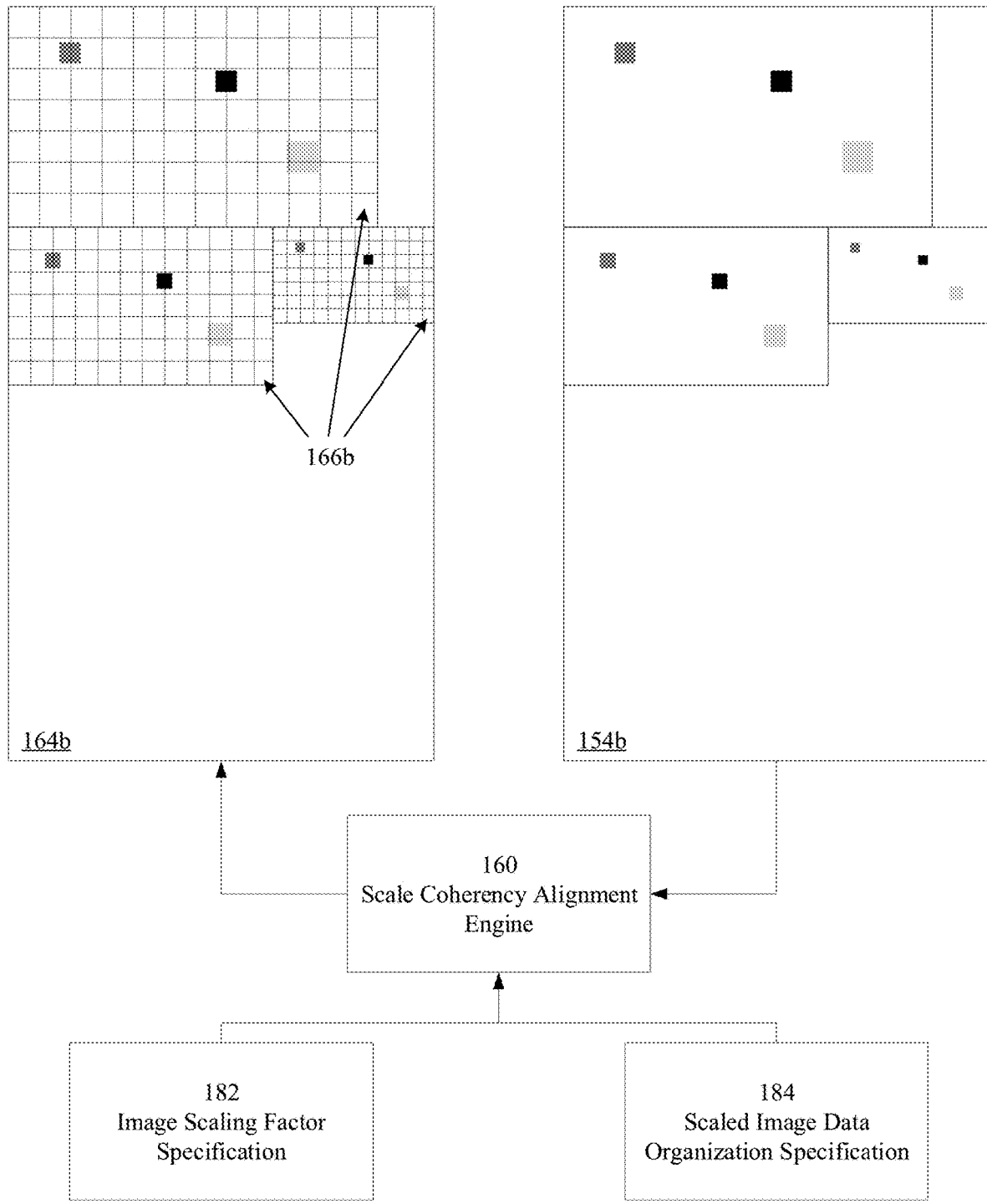

FIG. 5C illustrates an example of a Scale Coherency Alignment Engine 160 generating a set of Scale Coherent Response Maps 162a, 162b, . . . , and 162n based on interpreting a corresponding set of Scale Selective Response Maps 152a, 152b, . . . , and 152n, in further view of the Image Scaling Factor Specification 182 and the Scaled Image Data Organization 184 applied to the input Image Data. As illustrated, the Scale Coherency Alignment Engine 160 provides concordance across the different sized Scale Coherent Response Maps by providing, for example, concordance for a location 166 across the set of Scale Coherent Response Maps 162a, 162b, . . . , and 162n. Thus the information at a first Image Scale at a location 166 in a first Scale Coherent Response Map concords to the information at a location 166 at a second Image Scale in a second Scale Coherent Response Map 162b, and at a location 166 at a $N^{th}$ Image Scale in an $N^{th}$ Scale Coherent Response Map 162n, and so forth. FIGS. 6C and 7C illustrate the same in relation to a composite Scale Coherent Response Map 164a, and 164b, respectively. For example, as illustrated in FIG. 6 C, the Scale Coherency Alignment Engine may provide a composite Scale Coherent Response Map 164a comprising a plurality of Scale Selective Response Maps, wherein the information at a first Image Scale at a location 166a in a first Scale Coherent Response Map concords to the information at a location 166a at a second Image Scale in a second Scale Coherent Response Map, and at a location 166a at a third Image Scale in an third Scale Coherent Response Map. As similarly illustrated in FIG. 7C, the Scale Coherency Alignment Engine may provide a composite Scale Coherent Response Map 164b comprising a plurality of Scale Selective Response Maps, wherein the information at a first Image Scale at a location 166b in a first Scale Coherent Response Map concords to the information at a location 166b at a second Image Scale in a second Scale Coherent Response Map, and at a location 166b at a third Image Scale in an third Scale Coherent Response Map.

In an embodiment, the Scale Coherency Alignment Engine 160 may leverage the Scale Image Data Organization Specification 184 used to generate a Composite Scaled Image to omit or disregard predictions output by the Scale Selective Machine Learning System 150. For example, the Scale Coherency Alignment Engine 160 may omit responses at or near a perimeter of concatenation in a composite Scale Selective Response Map. For example, the Scale Image Data Organization Specification 184 may concatenate a plurality of Scaled Images 142a, 142b, and 142c, along an axis of a Composite Image 144a, as illustrated for example in FIG. 6A. Accordingly, data at or near a perimeter of a Scaled Image may be cut off or concatenated when arranged in the Composite Image. Similarly, a Scale Selective Response map based on a Composite Image may include responses located at or near a perimeter of concatenation comprising an invalid response or information as a result of concatenations applied to the underlying Scaled Image. Accordingly, the Scale Coherency Alignment Engine 160 may omit, disregard, or interpret Scale Selective Predictions at or near a perimeter of concatenation as comprising an invalid Prediction.

As further illustrated in FIG. 4, an output of the Scale Coherency Alignment Engine 160 may be provided as an input to the Dimensionally Aware Prediction Engine 170. For example, the Dimensionally Aware Prediction Engine 170 may receive a Scale Coherent Response Map 162 from the Scale Coherency Alignment Engine 160, and may further receive from the Dimensionally Aware Machine Learning Specification 180, the Scale Specification 186, the Object of Interest Specification 187, and the Image Sensor Specification 188, for use in generating the Prediction Output 132 comprising a Dimensionally Aware Prediction Label. Embodiments of the Object of Interest Specification 187 may comprise a size and properties of an Object-of-Interest supported by the Machine Learning System 130. Embodiments of Image Sensor Specification 188 may comprise calibration settings or other properties of the image sensor including, but not limited to: a focal length, a captured image size (e.g. a 12 megapixel digital camera may capture an image comprising 4032×3024 pixels), and a physical sensor size (e.g. a 1/2.55" digital camera sensor may have a size of 6.17 mm×4.55 mm). In an embodiment, the Machine Learning System 130 disclosed herein may comprise a step of calibration for determining properties of the Image Sensor, for use in defining the Image Sensor Specification 188.

The Dimensionally Aware Prediction Engine 170 may interpret each output of the Scale Coherency Alignment Engine to generate a corresponding Prediction Label comprising an Object Location of an object in the Image Data 110. For example, the Prediction Engine 170 may receive a plurality of Scale Coherent Response Maps (e.g. Scale Coherent Response Maps 162a, 162b, . . . , and 162n in FIG. 5C), or a composite Scale Coherent Response Map (e.g. composite Scale Coherent Response Maps 164a and 164b in FIGS. 6C and 7C, respectively), as provided by the Scale Coherency Alignment Engine 160, and further generate a Prediction Output 132 for one or more objects. Accordingly, the Prediction Output 132 may comprise an Object Location of one of the objects 121, 122, and 123 in the Image Data 110 based on interpreting the Scale Coherent Response Map(s). For example, the Prediction Engine 170 may stride a set of Scale Coherent Response Maps to identify Response Map Entries comprising an object with an In-Scope prediction, and then may predict an Object Location of the object based on, for example: knowledge of the In-Scope Scale, known properties (e.g. size) of the object, and properties of the image sensor used to obtain the underlying Image Data. The Object Location may correspond to a three dimensional spatial location of the corresponding object in the real world. In an embodiment, the Object Location is a three dimensional spatial location of the corresponding object in the real world relative to the Image Sensor that generated the input Image Data of the object. In an embodiment, the Object Location comprises an Object Planar Location (e.g. a two-dimensional spatial location of the object within the Image Data 110, for example, pixel coordinates of a center point of the object within the Image Data 110) and an Object Depth (e.g. a distance between the object and the image sensor 100 used to capture the Image Data 110).

Embodiments of a Prediction Output 132 may comprise other predictions about the corresponding object which may or may not relate to an Object Location. For example, the Prediction Output 132 may comprise predictions including, but not limited to: a rotation of the object, a 3D rotation of the object, a class or type of the object, a bounding box of the object, and a 3D bounding box of the object. The Prediction Output 132 may also comprise predictions that are a function of Object Location.

Embodiment of a Prediction Output 132 may determine an Object Location based on an Object Depth and an Object Planar Location. In an embodiment, for each In-Scope prediction for an object, the Prediction Engine 170 may determine a corresponding Object Depth or distance of the object relative to the image sensor, based on the In-Scope Scale(s), a known physical size of the object, the Image Scaling Factor applied to the Image Data to generate the Scaled Image having an In-Scope prediction, and properties of the image sensor, such as a focal length of the image sensor, an image size of the image sensor, and a physical size of the image sensor. In an embodiment, for each In-Scope prediction for an object, the Prediction Engine 170 may determine a corresponding Object Planar Location of the object. In an embodiment, the Prediction Engine 170 infers the Object Planar Location from a Scale Coherent Response Map which corresponds to Planar Locations in the underlying Scaled Image and input Image Data; in other words, each region or area of a Scale Coherent Response Map concords with a corresponding area or region in the underlying Scale Image or input Image Data.

In an embodiment, the Prediction Engine 170 may receive a Scale Coherent Response Map comprising a plurality of In-Scope Predictions which yield Object Planar Locations within a proximity distance to one another; and, may be configured to resolve each of the close proximity In-Scope Predictions as a single In-Scope Prediction of Object Planar Location. In an embodiment, a proximity distance may comprise a specified distance or may be learned through a Training Process of the Machine Learning System. Similarly, in an embodiment, the Prediction Engine 170 may receive a Scale Coherent Response Map comprising a plurality of In-Scope Predictions which yield Object Locations within a proximity distance to one another; and, may be configured to further resolve each of the close proximity In-Scope Predictions as a single In-Scope Prediction of Object Location. In an embodiment, the Prediction Engine 170 may resolve a plurality of close proximity Object Locations, or Planar Object Locations, by providing a range of Object Locations, or Planar Object Locations, respectively. For example, the Prediction Output 132 may comprise an Object Location comprising a range of In-Scope Object Locations bounded by minimum and maximum values of the close proximity Object Locations.

Embodiments of a Machine Learning System 130 as disclosed herein may be configured with a range of In-Scope Scales which yield a range of In-Scope Predictions, such as a range of In-Scope Object Depths. For example, the Scale Selective Machine Learning System 150 may be trained on a Scale Specification 186 comprising three In-Scope Scales. Thus, an In-Scope Prediction may occur within a single Scale Coherent Response Map when an Image Scaling Factor of the Image Scaling Factor Specification 182 results in the Scale Coherent Response Map comprising an object in the Image Data 110 at one of the three In-Scope Scales. An Object Depth, Object Planar Location, or Object Location, for example, may be computed for each In-Scope Scale Prediction across the plurality of Scale Coherent Response Maps, yielding a range of values. Accordingly, the Prediction Output 132 may comprise a range of In-Scope Predictions, such as a range of In-Scope Object Depths, Object Planar Locations, and/or Object Locations.

Figure 8:
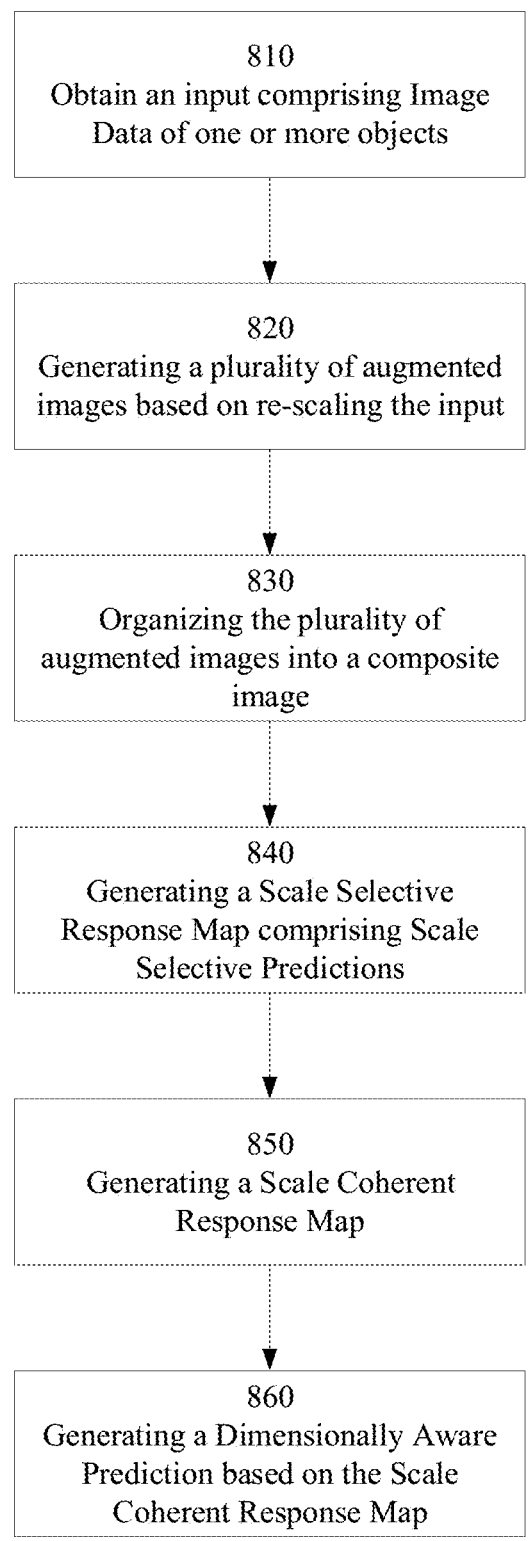
FIG. 8 is a flow chart of a method of generating a Dimensionally Aware Prediction Output in accordance with an embodiment of the present disclosure.

FIG. 8 illustrates a method 800 for localizing an object depicted in Image Data in accordance with an embodiment of the present disclosure. The operation of method 800 is not intended to be limiting but rather illustrates an example of localizing an object, for example localizing an object using a Dimensionally Aware Machine Learning System in accordance with the present disclosure. In some embodiments, the method 800 may be accomplished with one or more additional operations not described, and/or without one or more of the operations described. Similarly, the order in which the operation of the method 800 is illustrated and described below is not intended to be limiting, but rather illustrative of an example of localizing an object depicted in Image in accordance with an embodiment of the present disclosure.

In some embodiments, the method 800 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 800 in response to instructions stored electronically on an electronic storage medium. The one or more processing devices may include one or more devices configured through hardware, firmware, and/or software to be specifically designed for execution of one or more of the operations of the method 800.

The method 800 may include an operation 810 for obtaining an input image comprising Image Data of one or more objects, each object being depicted at an Image Scale indicative of a size of the corresponding object. In an embodiment, the operation 810 may comprise using one or more image sensors to generate one or more images, each image comprising Image Data of the object(s). In an embodiment, the operation 810 may retrieve the image(s) from a storage medium. In an embodiment, the image(s) comprise two-dimensional Image Data. In an embodiment, the image(s) comprise Image Data comprising a projection of the object(s) from a higher order dimension. The Image Data of the objects obtained by the operation 810 serves as a basis for other operations in accordance with the method 800.

The method 800 may include an operation 820 for augmenting an Image Data, such as augmenting the image(s) obtained from the operation 810. For example, the operation 820 may generate a plurality of Augmented Images based on manipulating an aspect of the input Image Data including but not limited to, manipulating aspects of size or scale, rotations, spatial translations or locations, and color. For example, the operation 820 may generate a plurality of Scaled Images based on re-scaling the input image(s), each Scaled Image generated based on a different Image Scaling Factor. Each Scaled Image thus corresponds to a different scaled sized variant of the same input Image Data, wherein each Scaled Image comprises the object(s) at a Variant Image Scale different from the Image Scale of the input image. In an embodiment, an Image Scaling Factor Specification may define a plurality of Image Scaling Factors to apply to the input Image Data. Embodiments of re-scaling an image include, but are not limited to, nearest-neighbour interpolation, bilinear interpolation, bi-cubic interpolation, and use of a Machine Learning System configured to rescale an image. In an embodiment, the operation 820 implements a Scaled Image Generation Engine in accordance with an embodiment of the present disclosure.

In an embodiment, the method 800 may include an operation 830 for organizing a plurality of Augmented Images, such as a plurality of Scaled Images that may be generated in accordance with an operation 820. In an embodiment, the operation 830 organizes a plurality of Scaled Images into a single composite image comprising the plurality of Scaled Images. For example, the operation 830 may apply a bin-packing algorithm to place the plurality of Scaled Images into a single composite image. In an embodiment, the operation 830 may concatenate the plurality of Scaled Images along a spatial axis of the composite image. In an embodiment, the composite image is generated in accordance with a Scaled Image Data Organization Specification in accordance with an embodiment of the present disclosure. In an embodiment, the operation 830 comprises applying a Scaled Image Data Organization Specification according to an embodiment of the present disclosure, to a plurality of Scaled Images.

In an embodiment, the method 800 may include an operation 840 for generating a plurality of Scale Selective Predictions. For example, the operation 840 may receive as an input, a plurality of Scaled Images, or a composite image comprising the plurality of Scaled Images, and may generate as an output, Scale Selective Predictions for each object in each Scaled Image. In an embodiment, the Scale Selective Prediction may comprise an In-Scope Prediction when a Scaled Image comprises an object at an In-Scope Image Scale. For example, for a given object, a Scale Selective Specification may define one or more In-Scope Image Scales for the object. Objects thus identified at the In-Scope Image Scale may trigger an In-Scope Response or Prediction. Accordingly, an operation 840 may include assessing the Variant Image Scale of each scaled object in the plurality of Scaled Images to determine whether the scaled object is depicted at an In-Scope Image Scale, or other Image Scale. In an embodiment, the Scale Selective Specification may define a set of In-Scope Image Scales and Out-of-Scope Image Scales, for use in generating a Scale Selective Prediction. In an embodiment the set of In-Scope Images Scales comprises a single In-Scope Image Scale. In an embodiment, the set of In-Scope Image Scales comprises a plurality of discrete In-Scope Image Scales. In an embodiment, the set of In-Scope Image Scales comprises one or more continuous ranges of In-Scope Image Scales. Similarly, embodiments of a set of Out-of-Scope Image Scales may comprise one or more continuous ranges of Out-of-Scope Image Scales.

Embodiments of an operation 840 may provide, as an output, a Scale Selective Response Map based on a corresponding Scaled Image, the Scale Selective Response Map comprising Scale Selective Predictions. For example, the operation 840 may generate a Scale Selective Response map having a same size and dimension as a corresponding Scaled Image or Composite of Scaled Images, wherein the Scale Selective Response map is encoded with a Response Map Entry for objects in the Scaled Image(s), each Response Map entry comprising a Scale Selective Prediction. In an embodiment, the Response Map Entry may be disposed at a location within the Scale Selective Response Map corresponding to a location of the object in the Scaled Image. In an embodiment, the Response Map Entry may be disposed at a location within the Scale Selective Response Map corresponding to a center location of the object within the Scaled Image. Embodiments of a Scale Selective Prediction may also comprise In-Scope and Out-of-Scope Predictions predicated on factors other than Image Scale including but not limited to, a class of an object, a rotation of an object, and a color of an object. For example, the operation may recognize an object as comprising an In-Scope Image Scale but may not be able to classify the object, and thus may output a Scale Selective Prediction comprising an Out-of-Scope response. In an embodiment, the operation 840 comprises implementing a Scale Selective Machine Learning System in accordance with an embodiment of the present disclosure.

In an embodiment, the method 800 may include an operation 850 for providing a coherent interpretation of the Scale Selective Response Maps. For example, the operation 850 may receive as an input, a plurality of Scale Selective Response maps, each having different sizes and dimensions in accordance with a corresponding Scaled Image, or, for example, may receive a Scale Selective Response Map comprising a composite of Scaled Selective Response maps corresponding to a composite image comprising a plurality of Scaled Images. As such, even though each Scale Selective Response map comprises different sizes and dimensions, they each nevertheless result from a re-scaling of the same input image(s). Accordingly, a coherent interpretation provides interpretative concordance across the different size and dimensions of the plurality off Scale Selective Response Maps. In an embodiment, interpreting Scale Selective Response Map is based on an Image Scaling Factor used to generate the corresponding Scaled Image. In an embodiment, the operation 850 interprets a Scale Selective Response Map based on an Image Scaling Factor Specification. In an embodiment, the operation 850 interprets a composite Scale Selective Response Map based on an Image Scaling Factor Specification and a Scaled Image Data Organization Specification. In an embodiment, the operation 850 comprise implementing a Scale Coherency Alignment Engine in accordance with an embodiment of the present disclosure.

In an embodiment, the operation 850 outputs a Scale Coherent Response Map for each Scale Selective Response Map, wherein each Scale Coherent Response Map has interpretive concordance with each other Scale Coherent Response map. In other words, the operation 850 may provide a consistent interpretation of the different sized and dimensioned Scale Selective Response Maps based on the transform applied to the original input Image(s). For example, a first Scale Coherent Response Map and second Scale Coherent Response Map may each comprise a plurality of regions, wherein each Scale Coherent Response Map comprises the same number of regions, wherein regions of the first Scale Coherent Response Map comprise a first size and regions of the second Scale Coherent Response Map comprise a second size different from the first size, and wherein a given region of the first Scale Coherent Response Map concords to a corresponding region in the second Scale Coherent Response Map. In an embodiment, the operation 850 may output a plurality of Scale Coherent Response Maps each having the same size and dimension based on re-scaling a corresponding plurality of Scale Selective Response Maps. In an embodiment, re-scaling a Scale Selective Response Map is based on applying an inverse of the Image Scaling Factor used to generate the underlying Scaled Image.

In an embodiment, the operation 850 may leverage the Scaled Image Data Organization Specification to omit or disregard invalid Scale Selective Predictions. For example, a composite image may comprise a plurality of Scaled Images concatenated in accordance with a Scaled Image Data Organization Specification. However, concatenating Scaled Images may result in cutting off data at or near a perimeter of concatenation, rendering it invalid. Accordingly, a Scale Selective Response Map generated therefrom may comprise invalid Scale Selective Predictions at or near a perimeter of concatenation in accordance with the underlying concatenations applied to the composite Scaled Image. As such, an operation 850 may omit, disregard, or interpret Scale Selective Prediction at or near a perimeter of concatenation as comprising an invalid Prediction.

In an embodiment, the method 800 may comprise an operation 860 for generating a Dimensionally Aware Prediction Output. In an embodiment, the Prediction Output comprises a Dimensionally Aware Prediction Label indicative of an Object Location. In an embodiment, an Object Location comprises an Object Depth and an Object Planar Location. In an embodiment, the Prediction Output comprises a Dimensionally Aware Prediction Label indicative of an Object Depth or an Object Planar Location. In an embodiment, the operation 860 infers the Object Planar Location from a Scale Coherent Response Map which corresponds to Planar Locations in the underlying Scaled Image and input Image Data; in other words, each region or area of a Scale Coherent Response Map concords with a corresponding area or region in the underlying Scale Image or input Image Data. In an embodiment, the operation 860 comprise implementing a Dimensionally Aware Prediction Engine in accordance with an embodiment of the present disclosure.

In an embodiment, the operation 860 may receive as an input, a plurality of Scale Selective Predictions, such as may be encoded within a Scale Coherent Response Map. The operation 860 may stride the Scale Coherent Response Map to identify Scale Selective Predictions comprising an In-Scope Response of a Variant Image of an object at an In-Scope Image Scale. For each In-Scope Prediction, the operation 860 may generate a Dimensionally Aware Prediction Output based on further knowledge of real properties of the object (such as an actual size of the object), the Image Scaling Factor used to generate the Scaled Image Variant, and properties of the image sensor used to generate the underlying Image Data including but not limited to a focal length of the image sensor, a captured image size (e.g. a 12 megapixel digital camera may capture an image comprising 4032×3024 pixels), and a physical image sensor size (e.g. a 1/2.55" digital camera sensor may have a size of 6.17 mm×4.55 mm). Based on this information, the operation 860 may localize an Object Planar Location of the object within the Scale Coherent Response Map, determine a distance or depth of the object from the Image Sensor, and further localize an Object Location within the real world. Embodiments of an operation 860 as disclosed herein may further comprise a calibration step for determining a properties of the image sensor.

Embodiments of an operation 860 may provide a Dimensionally Aware Prediction Output comprising Predictions which may or may not relate to an Object Location. For example, the 860 may output a Dimensionally Aware Prediction Output further comprising Predictions including but not limited to a rotation of the object, a 3D rotation of the object, a class or type of the object, a bounding box of the object, and a 3D bounding box of the object.

Embodiments of an operation 860 may received a Scale Coherent Response map comprising a plurality of Scale Selective Predictions comprising In-Scope Responses, each in close proximity to one another. The operation 860 may resolve the plurality of close proximity In-Scope responses as a single In-Scope Prediction, or may resolve the plurality of In-Scope response by providing a range of In-Scope Predictions which bound the In-Scope Responses of the Scale Coherent Response Map based on minimum and maximum values of the plurality of close proximity In-Scope Responses.

Figure 9:
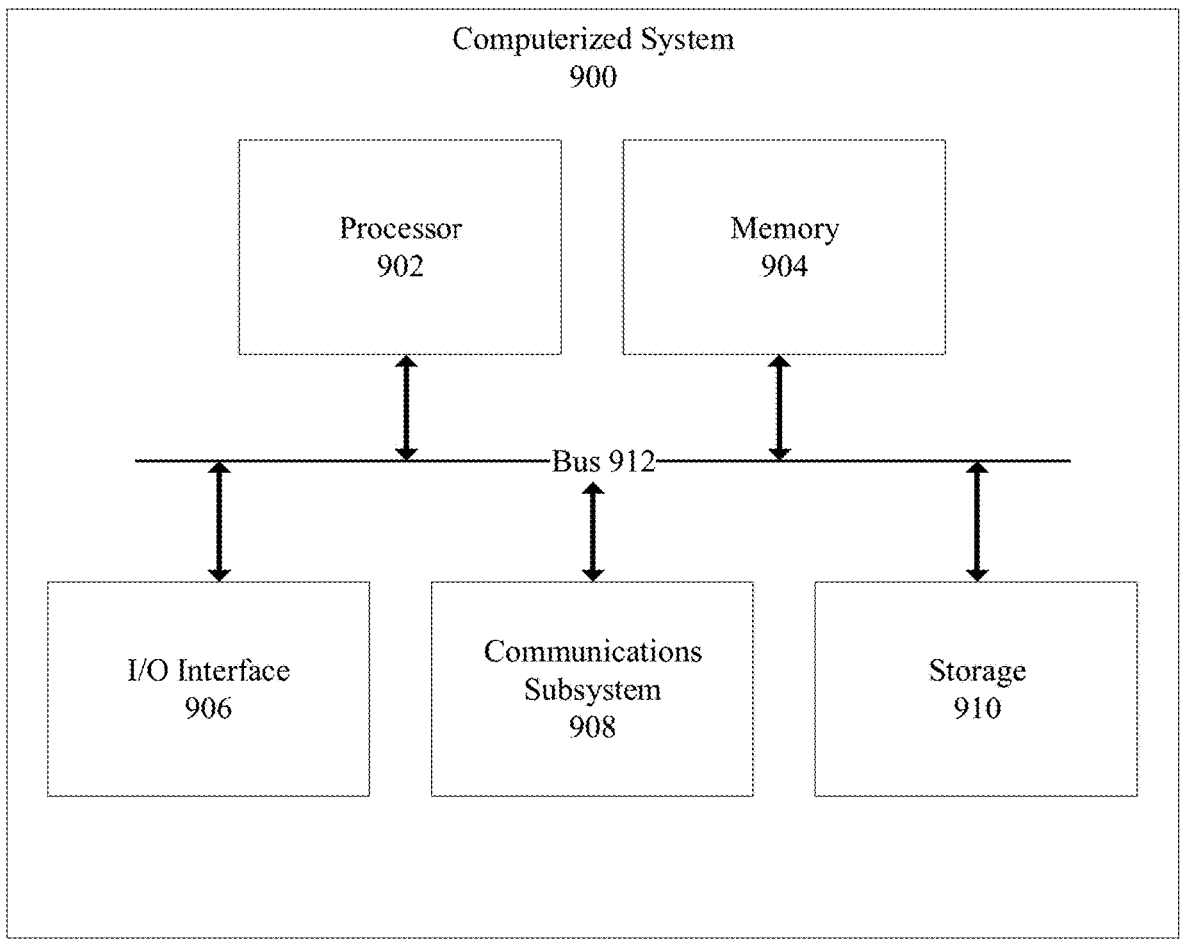
FIG. 9 is a block diagram of an example computing device or system for implementing systems and methods for a Dimensionally Aware Machine Learning System in accordance with the present disclosure.

FIG. 9 is a block diagram of an example computerized device or system 900 that may be used in implementing one or more aspects or components of an embodiment of a system and method for training and/or implementing a Machine Learning System which supports Scale Selective Image Classification Tasks in accordance with the present disclosure, for example, for use in implementing one or more operations or methods in accordance with the present disclosure such as the method 800 and/or operations 810, 820, 830, 840, 850, and/or 860; or, for use in implementing various aspects of an image sensor, Dimensionally Aware Machine Learning System, Scaled Image Generation Engine, Scale Selective Machine Learning System, Scale Coherency Alignment Engine, Dimensionally Aware Prediction Engine, Dimensionally Aware Machine Learning Specification, and/or other features, components, and subcomponents of a Dimensionally Aware Machine Learning System and methods as disclosed herein.

Computerized system 900 may include one or more of a processor 902, memory 904, a mass storage device 910, an input/output (I/O) interface 906, and a communications subsystem 908. Further, system 900 may comprise multiples, for example multiple processors 902, and/or multiple memories 904, etc. Processor 902 may comprise one or more of a digital processor, an analog processor, a digital circuit designed to process information, an analog circuit designed to process information, a state machine, and/or other mechanisms for electronically processing information. These processing units may be physically located within the same device, or the processor 902 may represent processing functionality of a plurality of devices operating in coordination. The processor 902 may be configured to execute modules by software; hardware; firmware; some combination of software, hardware, and/or firmware; and/or other mechanisms for configuring processing capabilities on the processor 902, or to otherwise perform the functionality attributed to the module and may include one or more physical processors during execution of processor readable instructions, the processor readable instructions, circuitry, hardware, storage media, or any other components.

One or more of the components or subsystems of computerized system 900 may be interconnected by way of one or more buses 912 or in any other suitable manner.

The bus 912 may be one or more of any type of several bus architectures including a memory bus, storage bus, memory controller bus, peripheral bus, or the like. The CPU 902 may comprise any type of electronic data processor. The memory 904 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 910 may comprise any type of storage device configured to store data, programs, and other information and to make the data, programs, and other information accessible via the bus 912. The mass storage device 910 may comprise one or more of a solid state drive, hard disk drive, a magnetic disk drive, an optical disk drive, or the like. In some embodiments, data, programs, or other information may be stored remotely, for example in the cloud. Computerized system 900 may send or receive information to the remote storage in any suitable way, including via communications subsystem 908 over a network or other data communication medium.

The I/O interface 906 may provide interfaces for enabling wired and/or wireless communications between computerized system 900 and one or more other devices or systems. For instance, I/O interface 906 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 900 may be used to configure, operate, control, monitor, sense, and/or adjust devices, systems, and/or methods according to the present disclosure.

A communications subsystem 908 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 908 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 908 may include one or more ports or other components (not shown) for one or more wired connections. Additionally or alternatively, communication subsystem 908 may include one or more transmitters, receivers, and/or antenna elements (none of which are shown).

Computerized system 900 of FIG. 9 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of providing a dimensionally aware prediction for an object in an image captured by an image sensor, using a scale selective machine learning system, comprising:
   obtaining an input comprising image data of an object at an input image scale;
   generating a plurality of variant images based on re-scaling the input with a plurality of different image scaling factors, each variant image comprising the object at a variant image scale;
   generating a plurality of scale selective predictions based on the plurality of variant images, and assigning an in-scope response when the variant image comprises the object at an in-scope image scale, and
   determining a location prediction for the object based on a scale selective prediction comprising the in-scope response.

2. The method of claim 1, further comprising assigning an out-of-scope response when the variant image comprises the object at an out-of-scope image scale.

3. The method of claim 1, further comprising determining the input image scale of the object based on an image scaling factor used to generate the object at the variant image scale having the in-scope response.

4. The method of claim 3, wherein determining the location prediction comprises comparing the input image scale of the object to a known size of the object.

5. The method of claim 1, further comprising determining the input image scale based on focal properties of the image sensor wherein the focal properties comprise at least one of a focal length of the image sensor, a size of the image data, and a size of the image sensor.

6. The method of claim 5, further comprising calibrating the image sensor to determine the focal properties of the image sensor.

7. The method of claim 5, wherein determining the location prediction comprises determining a distance between the object and the image sensor.

8. The method of claim 1, wherein determining the location prediction comprises determining a spatial location of the object within the input image data.

9. The method of claim 1, wherein the image data comprises a two-dimensional projection of the object from a higher order dimension.

10. The method of claim 1, further comprising generating a composite image comprising the plurality of variant images.

11. The method of claim 10, wherein generating the composite image comprises concatenating the plurality of variant images along an axis of the composite image.

12. The method of claim 11, wherein each of the plurality of scale selective predictions corresponding to a spatial location proximal to a concatenation comprise an invalid response.

13. The method of claim 10, wherein generating the composite image comprises arranging the plurality of variant images within the composite image in accordance with a bin-packing algorithm.

14. The method of claim 1, further comprising generating a scale selective response map comprising a plurality of response entries correspondingly encoded with the plurality of scale selective predictions of the plurality of variant images.

15. The method of claim 14, wherein the scale selective response map comprises a plurality of scale selective response maps, each corresponding to a variant image of the plurality of variant images.

16. The method of claim 15, further comprising re-scaling each of the plurality of scale selective response maps to the input image scale based on applying an inverse of an image scaling factor used to generate the corresponding variant image.

17. The method of claim 16, wherein a spatial location of a response map entry within the scale selective response map corresponds to a spatial location of the object within the variant image.

18. The method of claim 17, wherein determining a planar location of the object within the input image data is based on the spatial location of the response map entry encoded with the in-scope response.

19. The method of claim 1, wherein the plurality of image scaling factors are selected for generating the plurality of variant images based on down-sampling the input image data.

20. The method of claim 1, wherein the location prediction further comprises a prediction of at least one of a rotation of the object, a class of the object, and a bounding-box of the object.

* * * * *